United States Patent Office 2,838,456
Patented June 10, 1958

2,838,456

LUBRICATING OIL COMPOSITIONS

Fred W. Banes, Westfield, and William P. Fitzgerald, Florham Park, N. J., assignors to Esso Research and Engineering Company, a corporation of Delaware No Drawing. Application March 1, 1955
Serial No. 491,514

11 Claims. (Cl. 252—50)

This invention relates to lubricants and more particularly relates to lubricating oil compositions containing as additives, reaction products of unsaturated hydrocarbon polymeric compounds with unsaturated, polar, nitrogen-containing organic compounds. Still more particularly the invention relates to lubricating oil compositions containing multi-purpose additives especially outstanding as ashless sludge dispersants, such as for example the reaction products of unsaturated isobutylene-isoprene copolymers with acrylonitrile or vinylpyridine.

The utilization of additives in lubricating oil compositions is well known. These additives are used to improve one or more characteristics of the lubricating oil compositions such as viscosity index, pour point, oxidation resistance, corrosion resistance, detergency, and the like, and are employed extensively in lubricating oil compositions for internal combustion engines such as automotive and aviation engines. Due to the increasing severity of engine operation, there is a continuing and critical need for new and improved additives which are capable of imparting improved characteristics to the lubricating oil compositions. Preferably, such new additives will improve more than one characteristic or property of the oil.

A new class of products has now been found which are exceedingly useful as additives for lubricating oil compositions. Such lubricating oil compositions are particularly useful for lubricating internal combustion engines. These new products of this invention are outstanding ashless sludge dispersants and, in addition, demonstrate usefulness as viscosity index improvers and a certain amount of anti-wear and load-carrying activity. The lubricating oil compositions of this invention comprise a major proportion of a lubricating oil and a minor, but sludge dispersing proportion of a reaction product of an unsaturated hydrocarbon polymeric compound with an unsaturated, polar, nitrogen-containing organic compound.

THE UNSATURATED HYDROCARBON POLYMERIC COMPOUNDS

The unsaturated hydrocarbon polymeric compounds useful in the present invention have a Staudinger molecular weight in the range of about 4,000 to 60,000, preferably about 10,000 to 40,000. These unsaturated hydrocarbon polymeric compounds should have at least 5 mol percent unsaturation and will generally have a mol percent unsaturation (by the iodine-mercuric acetate method) of about 5 to 50, preferably 7 to 40. As examples of these unsaturated hydrocarbon polymeric compounds may be mentioned polybutadienes, natural rubbers, butadiene-styrene copolymers and partially hydrogenated derivatives thereof, high unsaturation isobutylene-isoprene copolymers and other polyisobutylenes modified with butadiene, piperylene, etc.

A preferred class of unsaturated hydrocarbon polymeric compounds useful in the present invention are copolymers of a major portion of an isoolefin of 4 to 8 carbon atoms with a minor proportion of a conjugated diolefin of 4 to 6 carbon atoms. Preferably, the conjugated diolefin is an aliphatic diolefin. As examples of the isolefins, the following may be mentioned: isobutylene, 2-methyl-1-butene, 2-methyl-1-pentene and 2-ethyl-1-hexene. The conjugated diolefins include the following: isoprene, butadiene, piperylene and 1,3-hexadiene. In general, these copolymers will contain about 50 to 95% by weight, preferably about 60 to 93 wt. percent, of the isolefin component and about 5 to 50%, preferably about 7 to 40%, of the conjugated diolefin component.

A particularly preferred unsaturated hydrocarbon polymeric compound useful in the present invention is a copolymer of isobutylene and isoprene. Such copolymers contain in the range of about 60 to 93 weight percent of the isobutylene component and in the range of about 7 to 40% of the isoprene component. For purposes of this invention, the unsaturated copolymer to be used should, in general, have a Staudinger molecular weight range from about 4,000 to about 60,000, preferably about 10,000 to 40,000. The iodine number should be about 20 to 100, preferably about 30 to 80, or, in other terms, it should have a mol percent unsaturation (by the iodine-mercuric acetate method) of about 5 to 50, preferably about 7 to 40. The preparation of these unsaturated copolymers of this type is well known in the art and may be accomplished by reacting about 1 to 10 parts by weight of isobutylene with 1 part of isoprene in the presence of methyl chloride diluent and $AlCl_3$ in methyl chloride as the catalyst. A diluent to feed ratio of 3:1 (by volume) is preferred. Solid $CO_2$ in naphtha is used as the refrigerant and the catalyst solution contains about 0.25 gram of $AlCl_3$ per 100 cc. of methyl chloride.

The chemical activity or susceptibility to chemical reaction of the unsaturated hydrocarbon polymeric compounds of this invention will vary directly with the mol percent unsaturation and inversely with the molecular weight and thus the relative degree of chemical inertness may be expressed mathematically in a rough way by the ratio of the Staudinger molecular weight divided by the mol percent unsaturation. This ratio may be an indication of the average or relative chain length between olefin groups and the polymer molecules. For the purposes of the present invention, only unsaturated hydrocarbon polymeric compounds of a relatively low inertness index of about 500 to 10,000, preferably 1,000 to 5,000, should be used. For instance, a polymeric compound having a Staudinger molecular weight of 10,000 should preferably have a mol percent unsaturation of about 5 to 10, whereas a polymer having a higher molecular weight of about 30,000 should have a higher mol percent unsaturation of about 10 to 20.

THE UNSATURATED, POLAR, NITROGEN-CONTAINING ORGANIC COMPOUNDS

The unsaturated, polar, nitrogen-containing organic compounds useful in the present invention are preferably unsaturated, polar, nitrogen-containing hydrocarbon monomers; in other words, unsaturated molecules consisting of carbon, hydrogen and nitrogen atoms. The preferred monomers are selected from the group consisting of acrylonitrile, vinylpyridine and the lower alkyl (methyl, ethyl and propyl) derivatives of acrylonitrile and vinylpyridine. Alpha, beta and gamma forms of vinylpyridine may be employed in this invention. The lower alkyl derivatives of acrylonitrile include methacrylonitrile, ethacrylonitrile and propacrylonitrile. Specific examples of the lower alkyl derivatives of vinylpyridine include 2-methyl-5-vinylpyridine, 2-vinyl-5-ethylpyridine, 2-vinyl-4-methylpyridine, 2-vinyl-6-methylpyridine. It will be understood that mixtures of these monomers may be reacted with the unsaturated hydrocarbon polymeric compounds (or their mixtures) described above. Although unsaturated, polar, nitrogen-containing hydrocarbon monomers are preferred, it will be understood that other unsaturated, polar, nitrogen-containing organic compounds may be employed such as vinyl pyrrolidone, for example.

THE REACTION PRODUCTS

The proportions in which the above-described polar monomers are to be used may range widely according to the ability of the unsaturated hydrocarbon polymeric compound and polar compound to react with each other, but normally should range from about 5 to 200, preferably 10 to about 100, parts by weight of the polar monomer to 100 parts by weight of the unsaturated hydrocarbon polymeric compound.

In order to effect the desired reaction, it is desirable to have a diluent or solvent present to the extent of about 1 to 10 volumes per volume of reactants, or about 100 to 1,000 cc. per 100 grams of reactants. Such solvents may be selected from those that are unreactive in the presence of free radicals. Hydrocarbon solvents such as cyclohexane, benzene, n-hexane, petroleum ether, n-heptane, n-octane, etc., or mixtures of these may be used and are preferred. Oxygenated solvents such as tertiary butyl alcohol, di-alkyl ethers, etc., may also be used.

It is also desirable to use a catalyst to make the polar monomer react with the unsaturated hydrocarbon polymeric compound. Materials such as benzoyl peroxide, ditertiary butyl peroxide, cumene hydroperoxide, tertiary butyl hydroperoxide, 2,2-bis tertiary butyl peroxy butane, hydrogen peroxide, etc., may be used. Generally, the amount thereof should be about 0.1 to 2.0%, preferably 0.3 to 1.0%, based on reactants.

The temperature at which the reaction takes place is partly dependent on the thermal decomposition temperature of the peroxide used, but is usually about 50 to 200° C., preferably about 75 to 175° C., and the time required ranges from about 1 to 10 hours, generally about 2 to 5 hours.

The order in which the reactants, solvent, and catalyst may be added can be varied, according to the reactivity of the materials involved. For example, all the materials may be mixed together at room temperature and then heated using a reflux condenser if the solvent used is volatile under the reaction temperature used. Such method is particularly suitable where the amount of inert solvent used is sufficient to prevent undue reactivity upon initial mixing or initial heating. If the reactants, such as especially acrylonitrile and vinylpyridine, are particularly active in polymerization tendency, and perhaps therefore may tend to make a homopolymer instead of adding on to the unsaturated hydrocarbon polymeric compound, the polar monomer may be added in successive increments or continuously over a period of time. Also, if various polar monomers are to be used the reaction may be run to at least partial completion with one polar monomer, then one or more additional polar monomers added. It also may be desirable to add the catalyst in different proportions, part with the unsaturated hydrocarbon polymeric compound and part with the polar monomer.

The solvent may be either a single material which is a solvent both for the unsaturated hydrocarbon polymeric compound and for the polar monomer, and part of the solvent may be used with each, or the unsaturated hydrocarbon polymeric compound may be dissolved in a pure hydrocarbon solvent while the polar monomer is dissolved in a polar solvent, and then the two solutions may be mixed.

The exact nature of the chemical reaction or reactions involved is not well understood, but it is believed that the unsaturated polar monomer forms a chemical addition product on the unsaturated hydrocarbon polymeric compound, at or adjacent to the point of unsaturation in the unsaturated hydrocarbon polymeric compound. It may be that only one molecule of the monomer reacts at that point, or it is also possible that a number of units of the monomer may build onto each other to form segmented polymers. It is possible that a number of molecules of polar monomer may polymerize entirely with each other, to form polar homopolymer molecules, which in some cases may be oil-insoluble, which are not attached in any way to the unsaturated hydrocarbon polymeric compound molecules, but this is undesirable and should be avoided by adjusting the polymerization conditions such as the proportion of solvent, the temperature, etc., or the polar monomer may be added in successive increments instead of all at once at the beginning of the reaction.

The resulting reaction products are polar derivatives of the unsaturated hydrocarbon polymeric compounds. They range in appearance from oily, viscous liquids to tacky, elastic solids. The reaction products are oil-soluble even when substantial amounts of, for example, acrylonitrile (which normally per se would form an oil-insoluble homopolymer) are reacted with the unsaturated hydrocarbon polymeric compound. This oil-solubility shows that the products of this invention are true reaction products and not mere mixtures. The preferred reaction products of this invention contain in the range of about .25–2.0% by weight of nitrogen. More preferably, the reaction products contain in the range of about .5 to 1.5% by weight of nitrogen. The proportions of ingredients and the reaction conditions, particularly the reaction time, are selected to produce reaction products containing the aforementioned nitrogen contents.

The invention will be more fully understood by reference to the following examples. It is pointed out, however, that the examples are given for the purpose of illustration only and are not to be construed as limiting the scope of the present invention in any way.

Example I

REACTION PRODUCT OF ISOBUTYLENE-ISOPRENE COPOLYMER WITH ACRYLONITRILE

A mixture of 100 grams of high unsaturation isobutylene-isoprene copolymer (12,500 Staudinger, 7.40 mol percent unsaturation made by copolymerizing 3 parts by weight of isobutylene with 1 part of isoprene in 3 volumes of methyl chloride as solvent, solid $CO_2$ in naphtha as refrigerant, and a solution of $AlCl_3$ in $CH_3Cl$ as catalyst), 280 grams of n-heptane, and 0.3 gram of benzoyl peroxide was placed in a 1000 cc. flask. This mixture was stirred and heated until the temperature had reached 95° C. A solution of .2 gram of benzoyl peroxide in 15 cc. of diethyl ether was mixed with 10 grams of redistilled acrylonitrile and diluted to 100 cc. with n-heptane. This mixture was added slowly and continuously to the polymer solution. The addition of the acrylonitrile solution consumed 45 minutes.

The reflux temperature was maintained at 95° C. for 4 hours. The reaction mixture was cooled, transferred to a short path still and heated to a pot temperature of 45° C. at 1 mm. of Hg to strip off the solvent and unreacted acrylonitrile. The product contained 0.91 wt. percent nitrogen equivalent to 3.4 wt. percent acrylonitrile. The product (product A) was oil-soluble indicating that it was a copolymer.

LUBRICATING OIL COMPOSITIONS CONTAINING PRODUCT A

The following blends of product A were made with a paraffinic mineral lubricating oil base stock and the V. I.'s determined.

| Blend No. | Wt. percent of Product A in Base Stock | Kin. Vis., SUS | | V. I. |
|---|---|---|---|---|
| | | 100° F. | 210° F. | |
| | 0 | | 45 | 113 |
| 1 | 1 | 199.4 | 48.1 | 125 |
| 2 | 3 | 291.2 | 57.5 | 130 |
| 3 | 6 | 478.1 | 75.8 | 133 |

The detergency property of product A was determined by testing a blend consisting of 4 wt. percent of product A in a paraffinic mineral lube oil base stock in a phorone-sulfuric acid test and a low temperature dispersancy test. In the LTD test, a small amount of sludge is added to the lubricating oil composition which is to be evaluated, the resultant composition thoroughly mixed and the upper portion decanted. This portion is allowed to stand for 24 hours and the sludge content of the upper portion thereof is determined by centrifuging. The larger the volume of this dispersed sludge in the LTD test, the better the lubricant additive. In the phorone test a small amount of phorone is added to the oil composition which is to be evaluated. The phorone simulates the sludge-forming products of partial combustion which exist in lubricating oil compositions used in internal combustion engines. Then $H_2SO_4$ is added to the composition to simulate the $SO_3$ formed in an engine. The more $H_2SO_4$ that can be added without forming sediment, the more effective is the lubricant additive.

The test results are summarized below:

| Blends Evaluated | | Phorone-$H_2SO_4$ Test | | LTD Test Vol. of Sludge, Dry (cc.) |
|---|---|---|---|---|
| Additive | Additive Conc. in Base Stock, percent | Vol. 10% $H_2SO_4$ (cc.) | Sediment (mg.) | |
| Product A | 4 | 8 | 0 | 0.75 |
| Do | 4 | 9 | 0 | |
| Do | 4 | 10 | 0 | |
| Commercial Det. Additive X | 4 | 8 | 105 | 0.35 |
| Commercial Det. Additive Y | 6 | (*) | (*) | 0.15 |
| Do | 8 | 8 | 12 | (*) |

* Not determined.

Commercial detergents X and Y are used extensively in the formulation of automobile crankcase lubricants. Product A was greatly superior to the commercial additive X in the phorone-$H_2SO_4$ test. Product A was also superior to additive X in the LTD test and superior to the commercial additive Y in both tests even at concentrations of 6 to 8% of Y.

Example II

REACTION PRODUCT OF ISOBUTYLENE-ISOPRENE COPOLYMER WITH 2-VINYLPYRIDINE

A mixture of 50 grams of high unsaturation isobutylene-isoprene copolymer (11,400 Staudinger molecular weight, 7.7 mol percent unsaturation), 125 grams of n-heptane, and 0.3 gram of benzoyl peroxide was heated to 95° C. in a 1000 cc. flask. A solution of 10 grams of freshly distilled 2-vinylpyridine and 0.2 gram of benzoyl peroxide in 90 grams of pyridine was slowly added to the polymer solution over a 94-minute interval. The reaction mixture was stirred at 95° C. for an additional 30 minutes after which it was cooled and stripped of solvent and unreacted vinylpyridine. The product weighed 52.5 grams and contained 0.56 wt. percent nitrogen; equivalent to 4.22 wt. percent vinylpyridine. The product (product B) was a copolymer rather than a mixture as demonstrated by its solubility in oil.

LUBRICATING OIL COMPOSITIONS

Blends of product B were made in a mineral oil base stock and viscosity measurements made from which the viscosity index of each blend could be derived. These data are summarized below:

| Blend No. | Wt. Percent of Product B in Base Stock | Vis. (SUS) at 210° F. | Viscosity Index |
|---|---|---|---|
| | 0 | 46.17 | 115 |
| 4 | 1 | 49.80 | 124 |
| 5 | 3 | 60.13 | 129 |
| 6 | 5 | 85.14 | 131 |

A blend consisting of 4 wt. percent of product B in a paraffinic mineral lube oil base stock was subjected to the tests described in Example I. The following results were obtained:

LOW TEMPERATURE DISPERSANCY TEST

In this test, it was impossible to centrifuge out any sludge, when employing the specified conditions of the test even though a large amount of sludge was dispersed in the oil. This indicates outstanding dispersancy properties.

PHORONE TEST

| Volume 10% $H_2SO_4$ | Wt. Sludge |
|---|---|
| 7 cc | No sludge. |
| 9 cc | No sludge. |

These results also indicate satisfactory sludge dispersancy properties.

THE LUBRICATING OIL COMPOSITIONS

Generally speaking, the lubricating oil compositions of this invention comprise a major proportion of a lubricating oil and a minor but sludge-dispersing proportion of the reaction product of the unsaturated hydrocarbon polymeric compound with the unsaturated, polar, nitrogen-containing organic compound. Preferred concentrations of the reaction product are in the range of about 0.1 to 10% by weight and even more preferably are in the range of about 1 to 5% by weight, based on the total composition. However, it will be understood that in certain instances, a greater or lesser proportion may be employed if desired. In general, it is preferred to market the reaction products of the present invention as additive concentrates containing about 10 to 75 wt. percent of the reaction product, based on the total additive concentrate. The remainder of the additive concentrate is generally a diluent oil, preferably a mineral lubricating oil.

The lubricating oil base stocks used in the compositions of this invention may be straight mineral lubricating oils or distillates derived from paraffinic, naphthenic, asphaltic or mixed base crudes, or if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichlorethyl ether, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may also be used. Also for special applications various organic esters or animal, vegetable or fish oils or their hydrogenated, polymerized or voltolized products may be employed, either alone or in admixture with mineral oils.

Synthetic lubricating oils having a viscosity of at least 30 S. S. U. at 100° F. may also be employed such as esters of monobasic acids (e. g. the ester of $C_8$ Oxo alcohol with $C_8$ Oxo acid; the ester of $C_{13}$ Oxo alcohol with octanoic acid, etc.), esters of dibasic acids (e. g. di-2-ethyl hexyl sebacate, di-nonyl adipate, etc.), esters of glycols (e. g. $C_{13}$ Oxo acid diester of tetraethylene glycol, etc.), complex esters (e. g. the complex ester formed by reacting one mole of sebacic acid with two moles of tetraethylene glycol and two moles of 2-ethyl-hexanoic acid; the complex ester formed by reacting one mole of tetraethylene glycol with two moles of sebacic acid and two moles of 2-ethyl hexanol; the complex ester formed by reacting together one mole of azelaic acid, one mole of tetraethylene glycol, one mole of $C_8$ Oxo alcohol, and one mole of $C_8$ Oxo acid), esters of phosphoric acid (e. g. the ester formed by contacting three moles of the mono-methyl ether of ethylene glycol with one mole of phosphorus oxychloride, etc.), halocarbon oils (e. g. the polymer of chlorotrifluoroethylene containing twelve recurring units of chlorotrifluoroethylene), alkyl silicates (e. g. methyl polysiloxanes, ethyl polysiloxanes, methyl-phenyl polysiloxanes, ethyl-phenyl polysiloxanes, etc.), sulfite esters (e. g. the ester formed by reacting one mole of sulfur oxychloride with two moles of the methyl ether of ethylene glycol, etc.), carbonates (e. g. the carbonate formed by reacting $C_8$ Oxo alcohol with ethyl carbonate to form a half ester and reacting this half ester with tetraethylene glycol), mercaptals (e. g. the mercaptal formed by reacting 2-ethyl hexyl mercaptan with formaldehyde), formals (e. g. the formal formed by reacting $C_{13}$ Oxo alcohol with formaldehyde), polyglycol type synthetic oils (e. g. the compound formed by condensing butyl alcohol with fourteen units of propylene oxide, etc.), or mixtures of any of the above in any proportions. Also mixtures of mineral oils and any of the aforementioned synthetic oils in any proportions may be utilized if desired.

For the best results the base stock chosen should normally be that oil which without the new addition agents present gives the optimum performance in the service contemplated. However, since one advantage of the agents is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the addition agent, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel service, particularly with high speed diesel engines, and in aviation engine and other gasoline engine service, oils of higher viscosity index are often preferred, for example, up to 75 to 100, or even higher viscosity index.

In addition to the materials to be added according to the present invention, other agents may also be used such as dyes, other pour depressors, heat thickened fatty oils, sulfurized fatty oils, organo metallic compounds, metallic or other soaps, sludge dispersers, foam suppressing agents, anti-oxidants, thickeners, viscosity index improvers, oiliness agents, resins, rubber, olefin polymers and colloidal solids such as graphite or zinc oxide, etc. Specific examples of such other compounds include dibenzyl disulfide, sulfurized sperm oil, voltolized sperm oil, phenyl alpha naphthylamine, polyisobutylene, polymerized lauryl methacrylate, diamyl trisulfide, sulfurized wax olefins, tricresyl phosphate, 2,6-di-tert. butyl-4-methyl phenol, and the reaction product of phenol with sulfur chloride treated diisobutylene. Solvents and assisting agents, such as esters, ketones, alcohols, thioalcohols, amines, aldehydes, halogenated or nitrated compounds, and the like, may also be employed.

What is claimed is:

1. A lubricating oil composition comprising a major proportion of a lubricating oil and about 0.1 to 10.0% by weight, based on the total composition, of a reaction product of about 10 parts by weight of a copolymer of a major proportion of an isoolefin of 4 to 8 carbon atoms with a minor proportion of a conjugated aliphatic diolefin of 4 to 6 carbon atoms, said copolymer having a molecular weight of about 4,000 to 60,000, and a mol percent unsaturation of about 5 to 50, reacted with about 5 to 200 parts by weight of an unsaturated, polar, nitrogen-containing hydrocarbon monomer selected from the group consisting of acrylonitrile, vinylpyridine and the lower alkyl derivatives thereof.

2. Composition according to claim 1 wherein the reaction is carried out in the presence of inert diluent and in the presence of a peroxide catalyst at a temperature of about 50 to 250° C. for a time sufficient to cause chemical addition of said nitrogen-containing monomer to said isoolefin-diolefin copolymer, said reaction product containing in the range of about .25 to 2.0% by weight of nitrogen.

3. Composition according to claim 1 wherein said copolymer is a copolymer of isobutylene and isoprene.

4. Composition according to claim 1 wherein said monomer is acrylonitrile.

5. Composition according to claim 1 wherein said monomer is vinylpyridine.

6. Composition according to claim 1 wherein said copolymer has an inertness index of about 500 to 10,000.

7. Composition according to claim 1 wherein said lubricating oil is a mineral oil containing about 1 to 5% by weight, based on the total composition, of said reaction product.

8. A lubricating oil composition comprising a major proportion of a mineral lubricating oil and about 0.1 to 10.0% by weight based on the total composition of a reaction product of about 100 parts by weight of a copolymer of a major proportion of isobutylene and a minor proportion of isoprene, said copolymer having a Staudinger molecular weight of about 10,000 to 40,000, and an inertness index of about 1,000 to 5,000, with about 1 to 100 parts by weight of an unsaturated, polar, nitrogen-containing hydrocarbon monomer selected from the group consisting of acrylonitrile, vinylpyridine and the lower alkyl derivatives thereof, in the presence of about 1 to 10 volumes of inert solvent, and about 0.1 to 2% of an organic perioxide catalyst, at a reaction temperature of about 50 to 200° C. at least about as high as the thermal decomposition temperature of the peroxide catalyst, for a time sufficient to cause chemical addition of said nitrogen-containing monomer to said isobutylene-isoprene copolymer, said reaction product containing in the range of about .25 to 2.0% by weight of nitrogen.

9. Composition according to claim 8 wherein said nitrogen-containing monomer is acrylonitrile.

10. Composition according to claim 8 wherein said nitrogen-containing monomer is vinylpyridine.

11. An additive concentrate consisting essentially of about 10 to 75% by weight of the reaction product of claim 8 and a diluent mineral lubricating oil.

References Cited in the file of this patent

UNITED STATES PATENTS

| | | |
|---|---|---|
| 2,509,777 | McMillian et al. | May 30, 1950 |
| 2,545,516 | Gessler | Mar. 20, 1951 |
| 2,623,032 | Banes et al. | Dec. 23, 1952 |
| 2,657,190 | Banes et al. | Oct. 27, 1953 |